Feb. 4, 1936.  J. F. DUBY  2,029,364
PLUMB GAUGE
Filed Feb. 23, 1932  2 Sheets-Sheet 1

Inventor:

John F. Duby

Feb. 4, 1936.     J. F. DUBY     2,029,364
PLUMB GAUGE
Filed Feb. 23, 1932     2 Sheets-Sheet 2

Inventor:
John F. Duby

Patented Feb. 4, 1936

2,029,364

UNITED STATES PATENT OFFICE 2,029,364

PLUMB GAUGE

John Fabien Duby, Boston, Mass.

Application February 23, 1932, Serial No. 594,515

4 Claims. (Cl. 33—203)

My invention relates to a plumb gauge, commonly known as a camber gauge when used in connection with vehicle wheel alinement. It should be noted, however, that my device is not limited to the above use as its adaptability for various other purposes will be clearly evident from the following description.

The primary purpose of my improved gauge is to measure the angle between a vehicle wheel and a wheel supporting surface, such as a level floor. If a pair of wheels, on a common axle, are to be tested then the respective spindles must be equal distances from the floor in order to obtain a correct reading. Heretofore the practice has been to use a level on the central part of the axle but this will not always bring the outer ends of the spindles in an even plane.

One of the objects of my invention is to provide a gauge adapted to determine when the outer ends of the spindles are on an even plane and subsequently be used to measure the angle referred to above by a quick and easy adjustment of certain parts which are adjustable for various sizes of wheels. Another object is to provide a gauge readily adapted to engage either a wheel rim or the tire. It is also desirable to have broad flat surfaces to contact with the wheel. Other objects and desirable features will be evident from the following description taken in connection with the accompanying drawings and claims.

Figure 1:
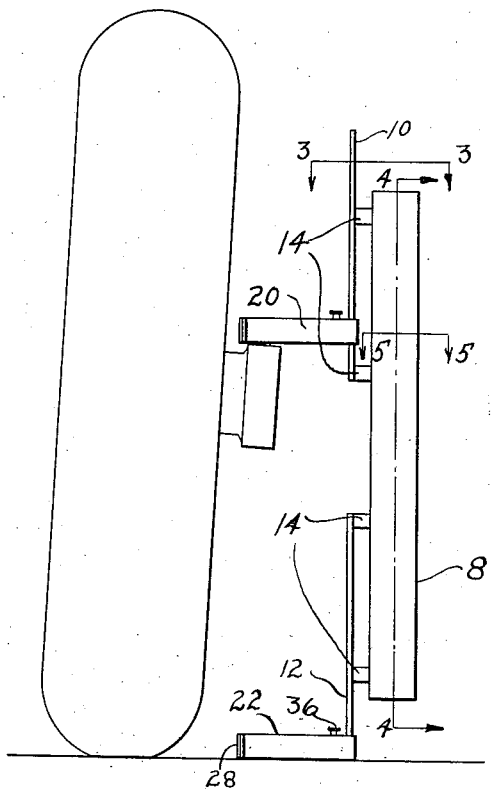
Figure 1 is a side elevation of my improved gauge illustrating its use for equalizing the height of the spindles.

The main body portion 8 of the gauge is preferably rectangular in cross-section and may be of any light weight material. Within this body portion is mounted a pointer and scale block to be described later. Adjacent a narrow side of body 8 I provide a pair of face plates 10 and 12 which may be set away from the body by cylindrical collars or spacers 14. Screw receiving plates 16 may be inserted within the body 8 to receive screws 18 whereby the face plates become fixed relative to the body portion. A suitable distance is allowed between the inner ends of these plates to make room for a wheel hub when making a test and to provide a hand grip area on the body 8. The primary purpose of these plates is to provide guideways, or tracks, for gauge head units 20 and 22 adapted for sliding engagement therewith but which are normally prevented from sliding thereon.

Figure 3:
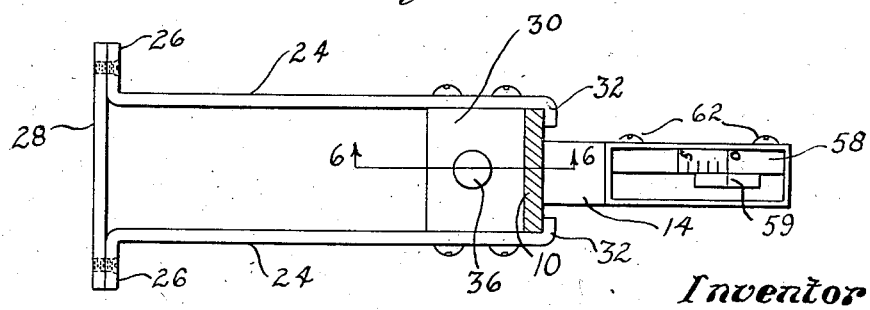
Fig. 3 is a plan view of the device taken on line 3—3 of Fig. 1.

The construction of each gauge head unit is similar, therefore a description of one is deemed to be sufficient. Referring to Fig. 3, the unit consists of a pair of side bars 24 having outwardly disposed ends 26 which may be connected by a wheel contact plate 28 secured thereto by screws or in any suitable manner. The opposite ends of the side bars are preferably attached to a spacer block 30 and extend slightly beyond the contact face of the block with its associated face plate. These ends of the side bars are flanged over to engage the opposite side of a face plate as shown at 32, the distance between their ends being slightly greater than the diameter of spacers 14 so as not to interfere with movement of the unit on its face plate longitudinally thereof.

Figure 4:
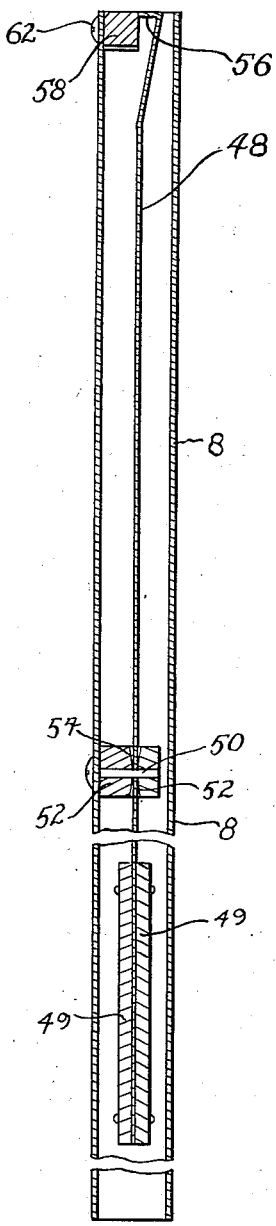
Fig. 4 is a vertical sectional view on line 4—4 of Fig. 1.
Figure 5:
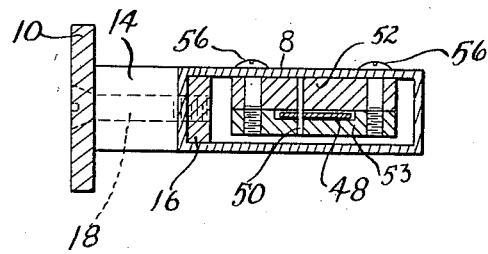
Fig. 5 is a cross sectional view on line 5—5 of Fig. 1.
Figure 6:
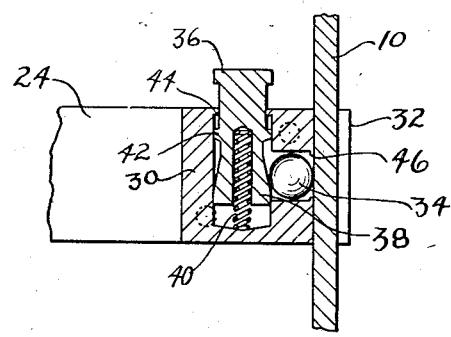
Fig. 6 is a detail sectional view on line 6—6 of Fig. 3.

The units 20 and 22 are normally held in clamped engagement with their respective face plate by means of a steel ball 34, as clearly shown in Fig. 6, which is suitably mounted in block 30. A plunger 36 protruding from one side of the block may be provided with a tapered, or conical portion 38 and a central bore adapted to receive a compression spring 40 which normally urges the conical portion against the ball and forces the latter outwardly against the face plate 10. An annular shoulder 42, on the plunger, engages a bead 44 at the block aperture to limit the outward movement of the plunger when the unit is removed from its face plate and ball 34 is likewise confined within the block by a bead 46. It will be clear that the gauge head unit may become readily slidable on its face plate by merely pressing on the plunger, thereby releasing the wedge action of ball 34; also that the unit may be quickly removed from or attached to its face plate. A compound pendulum composed of bar 48 and weights 49 is loosely pivoted on a shaft 50 within the body portion 8 as shown in Figs. 4 and 5. The shaft in turn is loosely mounted in a supporting unit composed of a plain block 52, provided with screw receiving holes, and a slotted block 53 having tapped holes to receive screws 56 which fasten the unit to the inside of the body portion. It should be noted that shaft 50 does not extend into the body walls but is confined therebetween. The face of each block is slightly rounded, as indicated at 54 to permit a slight sidewise tilting of the body 8 in any direction without disturbing the vertical position of the pendulum. The upper end 56 of the bar 48 may be suitably formed to engage a scale block 58.

A true test of wheel cant requires that the gauge be held in a vertical position with respect to a plane at right angles to that of the wheel. It will be clear from Fig. 4, that body 8 must be in a vertical position in order to cause the edge of end 56 to barely contact with the scale block. This will also create a slight friction between the above mentioned parts and serves to control the oscillation of the end 56 along the edge of the scale.

Figure 7:
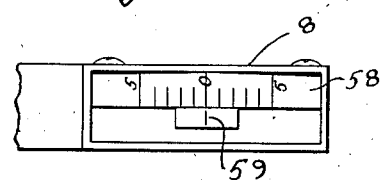
Fig. 7 represents a modification of the indicating means.

The scale block 58 may be attached to the body 8 by screws 62, and graduations on the block indicate degrees, with respect to a vertical position of the face plates 10 and 12, also contact plates 28. In order to minimize the proportions of the body I prefer to position the graduations substantially central of the block 58 as shown in Fig. 3. This brings the zero point, which represents the plumb position of the contact plates, to the right of center and in order to have the marker point register therewith I prefer to set the pivot shaft 50, Fig. 5, slightly to the left of center of bar 48. Therefore, with contact plates plumb, the marker point will register with zero on the block 58 but bar 48 will not hang strictly vertical. It is evident that the graduations may be positioned each side of zero as shown in Fig. 7 and a marker point 59 on the top portion 56 cooperates with the graduations on scale block 58 to permit a reading.

It will be clear that when contact plates 28, or face plates 10 and 12, are one degree away from vertical, the marker point will move one point on the scale away from zero. Hence, a direct reading is obtained which requires no calculating and no figures to be remembered.

The general operation of my camber and leveling gauge is as follows: The vehicle wheels should be supported by a level track or floor and the first test should be to ascertain whether or not the opposite wheel spindles or hubs are equidistant from the floor. The gauge head unit 22 may be moved to the lower end of plate 12 by manipulation of plunger 36 as described. This provides a try-square arrangement at that point and the device is then placed in position as shown in Fig. 1. The unit 20 may then be moved downwardly in a similar manner until its under side contacts with the upper edge of the wheel hub. Releasing the plunger will clamp unit 20 to its face plate whereupon the entire device may be readily moved to the opposite wheel for comparison. The shortest dimension may be retained and sufficient air released from the other wheel tire to equalize the distances.

Figure 2:
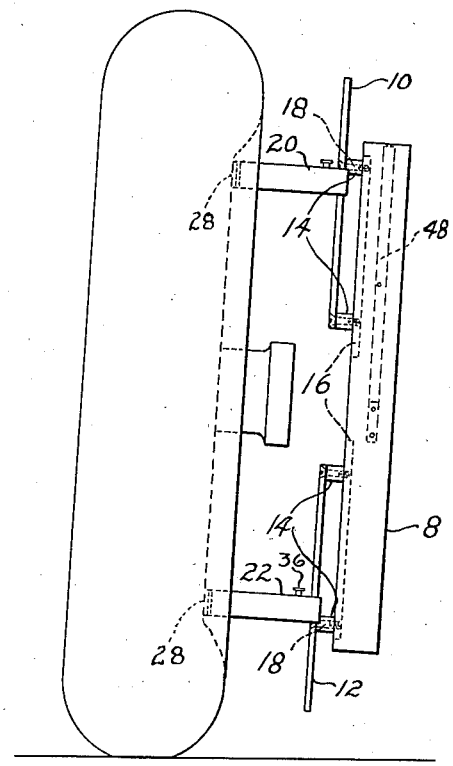
Fig. 2 is a similar view but illustrating its use when measuring the wheel angle.

The gauge head units may then be moved on their respective face plates to a position which will afford proper contact of the plates 28 with a wheel part, usually the rim, as shown in Fig. 2. Obviously, this movement will vary according to the wheel diameter and may be equalized in order that the wheel hub will not interfere with plate 10 or 12. With the gauge in this position the reading on block 58 is plainly visible to the operator and may be noted as above described. In unusual cases, the units 20 and 22 may be removed and a test made by applying face plates 10 and 12 either against the rim or tire and still obtain an accurate reading, because the plates are always parallel with contact plates 28.

It is to be understood that the forms of my invention herein shown and described are to be taken as preferred embodiments thereof and that the scope of the invention is more clearly defined by the accompanying claims.

I claim

1. A device for testing wheel cant including a hollow body portion, elongated gauge head supporting members connected to said body, gauge head units adapted to be held in a predetermined position on said supporting members, indicating means pivotally supported within said body portion, said means comprising a weighted pointer and a scale member, a pivot shaft for said pointer, said shaft being positioned to one side of the center of gravity with respect to the pointer member, in order that the proportions of said body portion may be minimized.

2. A device of the class described comprising an elongated body portion having at least one elongated gauge-head-supporting member disposed at one side thereof, a gauge-head unit adapted for sliding connection with the supporting member, and automatic locking means carried by said unit operating to hold the latter in operative relationship with the supporting member, said locking means comprising a spring actuated tapered member adapted to force the ball against the supporting member and being depressible at will to facilitate rapid adjustment of the unit longitudinally of the supporting member.

3. A device for testing wheel cant including an elongated body portion, gauge head supporting means attached to said body portion, a pair of gauge head units movably mounted on said supporting means, spring actuated means for locking said gauge head units each in a desired position with respect to the supporting means, an indicating member pivotally associated with said body portion, the pivotal connection and the association between the indicating member and the body portion being so arranged as to allow free oscillation therebetween to a limited extent, the pivotal point of said indicating member being positioned away from its center of gravity a sufficient amount to overcome frictional resistance and cause the member to assume an upright position with respect to its center of gravity and the pivotal point when the body portion is in a generally vertical position, said indicating member being adapted to indicate when the body portion lies in a vertical plane at right angles to the wheel plane and to cause oscillatory movement to be dampened when the body portion is in that position in addition to its function of indicating the angle of the wheel plane.

4. A device for testing wheel cant including an elongated body portion, gauge head supporting means attached to said body portion, a pair of gauge head units movably mounted on said supporting means, an elongated indicating member pivotally associated with said body portion, the pivotal connection and the association between the indicating member and the body portion being so arranged as to allow free oscillation therebetween to a limited extent, the pivotal point of said indicating member being positioned away from its center of gravity a sufficient amount to overcome frictional resistance and cause the member to assume an upright position with respect to its center of gravity and the pivotal point when the body portion is in a generally vertical position, said indicating member being so mounted as to cause a portion remote from its pivoting point to barely make frictional contact with a part fixedly attached to said body portion when the body portion lies in a vertical plane at right angles to the wheel plane.

JOHN FABIEN DUBY.